Dec. 9, 1958      W. H. TAYLOR      2,863,304
BLADE MEANS FOR HEAT EXCHANGE ANNULI
Filed July 11, 1955      2 Sheets-Sheet 1
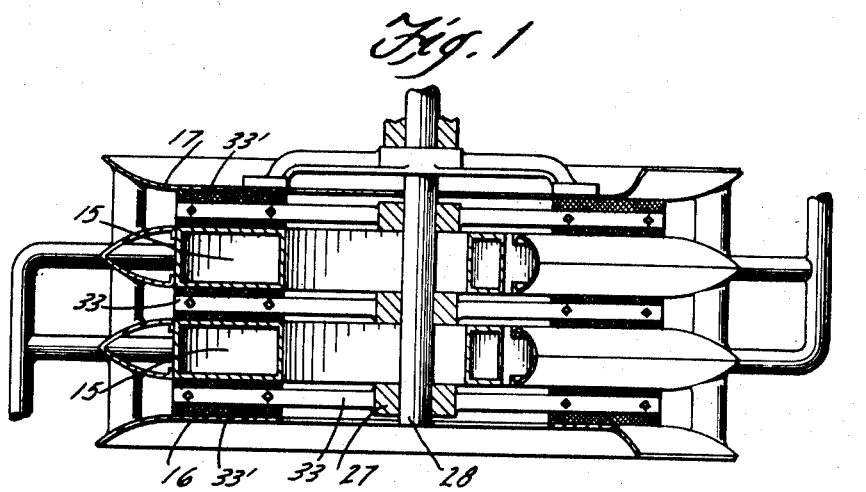
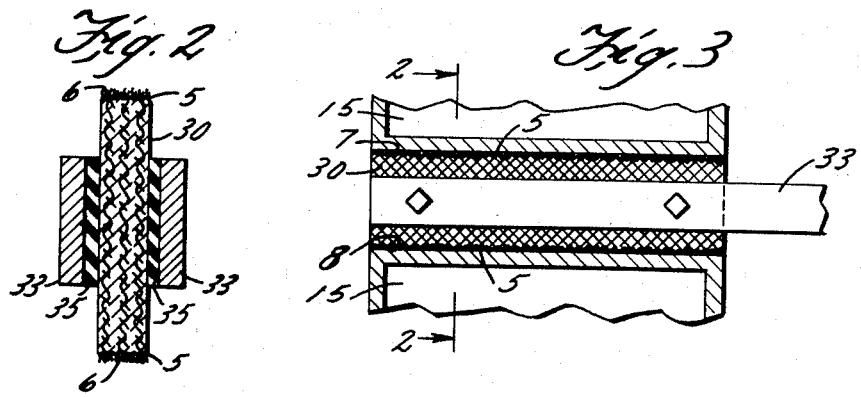
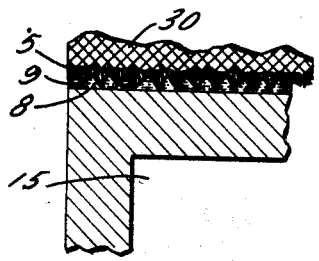
INVENTOR.
WILLIAM H. TAYLOR
BY
Wheeler, Wheeler + Wheeler
ATTORNEYS

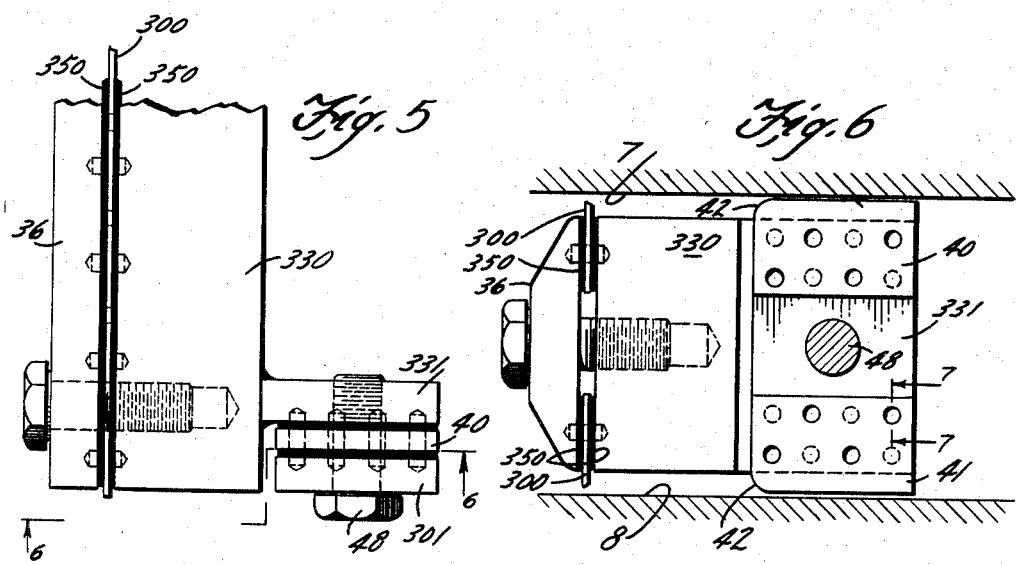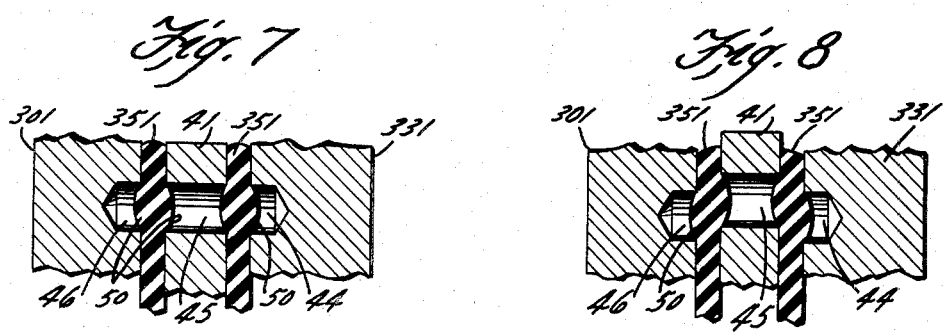

United States Patent Office 2,863,304
Patented Dec. 9, 1958.

2,863,304

BLADE MEANS FOR HEAT EXCHANGE ANNULI

William H. Taylor, Chicago, Ill.

Application July 11, 1955, Serial No. 521,090

13 Claims. (Cl. 62—284)

This invention relates to blade means for heat exchange annuli.

In my previous Patent 2,321,262, I disclosed blades intervening between opposed faces of space heat exchange annuli, the respective blades functioning individually on respective faces. The present device uses blade means including on the same supporting arm oppositely directed scrapers or wipers, whereby reaction pressures are in balance and a smoother and less noisy operation results.

When the heat exchanger is used for refrigeration, scraping blades are subjected to vibrating impulses heretofore supposed to be entirely lateral but now discovered to include a substantial component toward and from the heat exchange surface. Thus a feature of the present invention consists in a blade mounting in which side surfaces of the blade means extending into immediate proximity to its cutting edge are confined between vibration-damping elastomeric cushions which are engaged with the blade means and external clamping surfaces in shear. The simplest and least expensive means for providing this arrangement is to bore holes in the blade and the opposing clamping surfaces and to subject the rubber cushions to sufficient pressure so that they expand into these holes.

Similarly with especial reference to heat exchange devices for refrigeration, the blade means is provided with runners which desirably are disposed behind each blade in engagement with the ice surface upon which the advancing blade has acted. The support provided by such runners effectively stabilizes the blade and damps vibration and, therefore, eliminates noise. The runners are desirably advanced beyond the blades toward the heat exchange surface and displaced away from the heat exchange surface by the ice upon which they ride, the runners being mounted in rubber in shear to accommodate such displacement. The rubber mounting may be identical with that used for the blades.

Where the principal function of the blades is to dislodge molecular layers of air adhering to the heat exchange surfaces, I have found it advantageous to make the blades of some woven fabric desirably impregnated with plastic to bond the individual, woven strands to each other and to stiffen the blade without necessarily making it as rigid as if it were made wholly of plastic or of metal. Sisal has been found to be an excellent material from which to weave material of the blade, where this type of blade is desired.

Regardless of the material of which the blade is made, the oppositely directed edges may be sawtoothed. If the heat exchange surfaces are extremely cold, the sawtoothed edges of the blades tend to produce ridges in the ice which forms on such surfaces, thereby increasing the effective area sufficiently to compensate for the loss of heat transfer resulting from the coating of ice. If the blade is woven, as from sisal, cutting of the teeth in its margin tends to free the ends of the fibers, resulting in a desirable brushing action.

In the drawings:

Fig. 1 is a view in axial cross section of a heat exchange device closely comparable to that disclosed in my patent above identified.

Fig. 2 is an enlarged detail view taken in section on the line 2—2 of Fig. 3.

Fig. 3 is an enlarged detail view of one of the sawtoothed blades as it appears in side elevation, portions of the adjacent heat exchange annuli being shown in radial section.

Fig. 4 is a further enlarged fragmentary detail of a portion of the structure shown in Fig. 3.

Fig. 5 is a plan view on an enlarged scale of the end portion of a blade and runner assembly for use in a refrigerant heat exchanger.

Fig. 6 is an end elevation of the structure of Fig. 5.

Fig. 7 is a detail view in cross section showing on an enlarged scale a cross sectional view taken on the line 7—7 of Fig. 6.

Fig. 8 is a view similar to Fig. 7 showing displacement of the runner under pressure of ice.

The annular chambers 15 are axially spaced along a drive shaft 28 upon which is mounted one or more hubs 27 from which project in a generally radial direction the arms 33. It will, of course, be understood that shaft 28 will be provided with means for rotating it at very high speeds as disclosed in my Patent 2,321,262. Arms 33 are arranged in pairs as shown in Figs. 1 and 3 of my patent above identified. The reference characters herein used identify corresponding parts in said patent.

Clamped between the paired arms 33 are blades 30 confined between pads 35 of rubber or the like to damp vibration. In this embodiment, the blades are indicated as being made of woven material bonded together with plastic and having toothed margins 5 which are opposed axially of the drive shaft 28 and desirably have exposed fiber ends as shown at 6 in Fig. 2. The margins 5 of blades 30 concurrently wipe the opposed faces 7 and 8 of the axially spaced chambers 15 between which arms 33 revolve in the rotation of shaft 28. The enlarged detail in Fig. 4 shows the manner in which the teeth along the edge 5 of blade 30 have formed complementary grooves in the frost or ice built up at 9 on the surface 8 of one of the heat exchange chambers 15.

It will be evident that the blade means is relatively vibration-free, not only because of the rubber pads 35 but, more particularly, because the pressures developed between the respective blades 30 and the opposed heat exchange surfaces are always equal and opposite. Any tendency of the blade to be forced away from one of the heat exchange surfaces, as by an accumulation of frost, will increase the pressure of the blade against the other heat exchange surface. Thus the device is inherently in balance and tends to maintain the blades in vibration-free operation.

It will also be understood that it is unnecessary that the balancing pressure is supplied by a heat exchange surface. The top and bottom surfaces of the upper and lower chambers 15 may, for example, be engaged by blades 33' which also extend oppositely into engagement with the pan-shaped elements 17 and 16 of the housing. Here the engagement is solely for balancing purposes, no heat exchange to or from the surfaces 16 and 17 being required.

The blade mounting shown in Figs. 5 to 8 may optionally include the same balanced arrangement above described. It is illustrated as applied to a heat exchanger used for refrigeration. The arm 330 comprises a single heavy arm instead of the two arms 33 originally described.

Bolted to it is a clamping plate 36. Between the clamping plate and the face of the arm are a pair of generally radial blades 300 for scraping ice which accumulates on the opposed refrigerated heat exchange surfaces 7 and 8. Because the blades 300 are desirably made of extremely hard steel, and may even be toothed, they are not maintained in a position for actual contact with surfaces 7 and 8, but in practice are spaced aproximately $1/16$ of an inch from the respective surfaces.

The blades are confined between elastomeric cushions or pads 350 comparable to those shown at 35 in Fig. 2. These may comprise natural or synthetic rubber. However, in order to position the blades with accuracy, while, at the same time, resiliently accommodating substantial displacement if need be, the cushions are connected in shear both with the clamping means and the blades themselves. In practice, this is most economically done by providing apertures in the metal surfaces between which the rubber pads are clamped and allowing the rubber to be de-formed into such apertures under the clamping pressure. The arrangement is more particularly described in conjunction with Figs. 7 and 8 which happen to show details of the similar mounting of the shoe or runner with which each blade is desirably provided.

As an example of the accuracy of blade location which may be achieved by the resilient bias of rubber in shear, it may be noted that I have subjected the opposing blades to sufficient pressure to displace them each by a distance of $1/16$ of an inch inwardly toward each other, which displacement greatly exceeds anything which will be required of them in usage. Upon the release of the displacing pressure, the blades have returned to within $1/1000$ of an inch of their original positions.

Connected to each of the arms 330, desirably at the rear thereof, as viewed in the direction of arm movement, I provide a trailing arm 331 which has a clamp plate 301 bolted to it. This clamp plate holds to the trailing arm 331 upper and lower runners 40 and 41, respectively. These are slightly curved at 42 at their leading corners but have a supporting edge of about one inch in length which is desirably spaced initially within $1/32$ of an inch of the respective refrigerated heat exchange surface 7 or 8. Both the arms 331 and the clamping plate 301 and the runner blades themselves are provided with apertures such as those indicated at 44, 45, 46 in Figs. 7 and 8. The rubber cushions 351 are disposed at both sides of each blade and the pressure developed by the clamping bolt 48 is sufficient to de-form the rubber cushions into the apertures in the manner indicated at 50.

Since the runners are initially within $1/32$ of an inch of the metal surfaces of the heat exchange surfaces and since the blades 300 shave off the ice at a distance of approximately $1/16$ inch from such surfaces, it will be evident that the runners must be displaced in order to ride on the surface from which the ice is shaved by the blade. This displacement has the effect of developing very substantial equal and opposite pressures of the runners in an outward direction to center the propelling arms 330 between the heat exchange surfaces and to resist and damp all tendency of the arms to vibrate as the blades cut the ice. Fig. 8 shows the blade 41 displaced with respect to the trailing arms 331 and the clamps 301 as it may be when riding on ice at the level to which the ice has been shaved by the scraper. The relative position of rest of the parts in the absence of ice is illustrated in Fig. 7. In practice, the arrangement not only damps vibration in the arm and blade assemblies, but the yielding runner pressure also damps any tendency of the heat exchange surfaces themselves to vibrate. Consequently, the operation is accompanied by only slight noise as compared with the very noisy operation of previous devices of this character. The substantial envelopment of the blades in a rubber mounting in shear, and the provision of the runners, are the features principally responsible for silencing the operation of the device, the oppositely directed positions of the blades being secondary as far as silencing is concerned.

I claim:

1. The combination with a pair of opposed surfaces of annular form and a shaft extending therethrough, of generally radial arms extending from the shaft between such surfaces and blade means mounted on such arms, the blade means of each arm having axially opposed marginal elements at the same side of the shaft in substantially balanced pressure engagement with the opposed surfaces.

2. The device of claim 1 in which the marginal elements comprise ice scrapers.

3. The device of claim 1 in which the opposed marginal elements are toothed.

4. The device of claim 1 in which the blade means comprises a plastic-reenforced fabric having free fiber ends exposed marginally.

5. The device of claim 1 in which at least one such surface comprises a wall of a heat exchange chamber having a refrigerant connection, whereby the surface engaged by the blade means is subject to accumulations of frost, said element having a supporting runner riding on the frost behind the blade means.

6. The combination with a refrigerant passage having a wall provided with a heat exchange surface which is exposed and upon which ice may accumulate, of a scraper mounted for movement across said surface, and a runner connected with said scraper for supporting it from the ice on said surface.

7. The device of claim 6 in which said runner is provided with means mounting it for yielding movement respecting the scraper and is positioned by said means at a level which, in the absence of ice, is closer to the heat exchange surface than the scraper, whereby said runner rides in pressure contact with ice behind the scraper.

8. The device of claim 6 in which the heat exchange surface is annular and the scraper mounting includes a shaft extending through said surface and an arm extending outwardly from the shaft and upon which the scraper is mounted, the runner being disposed on a trailing arm behind the arm first mentioned and having a resiliently yieldable mounting, said runner being normally closer to the surface than the scraper in the absence of ice and being displaced against the bias of its resiliently yieldable mounting in traversing ice previously traversed by the scraper.

9. The device of claim 8 in which the resiliently yieldable mounting comprises rubber cushions at opposite sides of the runner and a clamp compressing said cushions against said trailing arm, said clamp and trailing arm and running having openings into which the rubber is de-formed under the clamping pressure.

10. The combination with an annular heat exchanger comprising a passage having a wall provided with a heat exchange surface which is exposed and upon which ice may accumulate, a shaft extending through the heat exchanger, arm means projecting from the shaft and comprising opposed clamping elements, rubber cushions abutting the respective clamping elements, a scraper confined between the cushions and having a slightly projecting scraping margin for traversing said heat exchange surface to scrape excessive ice therefrom, said rubber cushions being in compression and being engaged with said scraper to resist in shear any displacement of the scraper away from said surface, said arm being further provided with a second arm projecting approximately at right angles therefrom and a runner carried by the second arm to move peripherally over said heat exchange surface upon ice formed thereon, said runner having a resiliently yieldable mounting from said second arm whereby to be biased against displacement away from said heat exchange surface.

11. The combination with opposed annular refrigerant chambers in axially spaced relation having opposed heat exchange surfaces, of a shaft disposed substantially axially of said chambers and provided with arms projecting in a generally radial direction between said surfaces, stiff blade means mounted in rubber on said arm means and extending in opposite directions axially from their respective arm means to the opposed surfaces for pressure balanced engagement with ice forming on the opposed heat exchange surfaces, each such blade means extending directly and substantially continuously from one of said surfaces to the other.

12. The device of claim 11 in further combination with a runner mounting connecting with said arm, oppositely directed runners positioned to ride circuitously on the ice forming on said surfaces whereby to position said blade means.

13. The device of claim 12 in which the runner mounting comprises resiliently yieldable means biasing the runner means against displacement from their respective opposed heat exchange surfaces.

References Cited in the file of this patent

UNITED STATES PATENTS

| | | |
|---|---|---|
| 192,233 | Cook | June 19, 1877 |
| 1,020,759 | Holden | Mar. 19, 1912 |
| 2,159,463 | Voorheis | May 23, 1939 |
| 2,321,262 | Taylor | June 8, 1943 |
| 2,613,136 | McKay | Oct. 7, 1952 |
| 2,622,114 | Carney | Dec. 16, 1952 |